United States Patent [19]

Huber

[11] 4,124,859
[45] Nov. 7, 1978

[54] MULTI-EFFECT PORTABLE CAMERA VIGNETTE

[76] Inventor: Warren Charles Huber, 939 Kensington East, Dyer, Ind. 46311

[21] Appl. No.: 778,263

[22] Filed: Mar. 16, 1977

Related U.S. Application Data

[63] Continuation-in-part of Ser. No. 669,388, Mar. 22, 1976, abandoned.

[51] Int. Cl.² ............................................. G03B 11/00
[52] U.S. Cl. .................................... 354/296; 354/122
[58] Field of Search ...................... 354/122, 295, 296; 350/58, 59, 65, 257, 318

[56] References Cited

U.S. PATENT DOCUMENTS

| | | | |
|---|---|---|---|
| D. 234,008 | 12/1974 | Ritter | 354/122 X |
| 1,068,862 | 7/1913 | Digweed | 354/122 |
| 1,396,717 | 11/1921 | Leonard | 354/296 |
| 2,375,420 | 5/1945 | Laube | 350/58 X |
| 3,122,077 | 2/1964 | Splendore | 354/122 X |
| 3,940,775 | 2/1976 | Bodnar | 354/122 |

*Primary Examiner*—John Gonzales
*Attorney, Agent, or Firm*—Alter and Weiss

[57] ABSTRACT

A portable vignetting system attaches directly to the lens element of a photographic instrument enabling on-site creation of selected vignette effects with results comparable to those achieved under studio conditions. A main housing accommodates a camera lens at one end and a series of vignetting lids at the other. Each lid has formed therethrough an aperture of selected size and shape producing the desired vignette. Structure on the lid an housing cooperates to enable the lid to rotate with respect to the housing and to positively engage the housing at a multiplicity of precisely defined sites. The system may be used to create multiple vignette effects by combining different lids while making multiple exposures on a single film segment.

15 Claims, 14 Drawing Figures

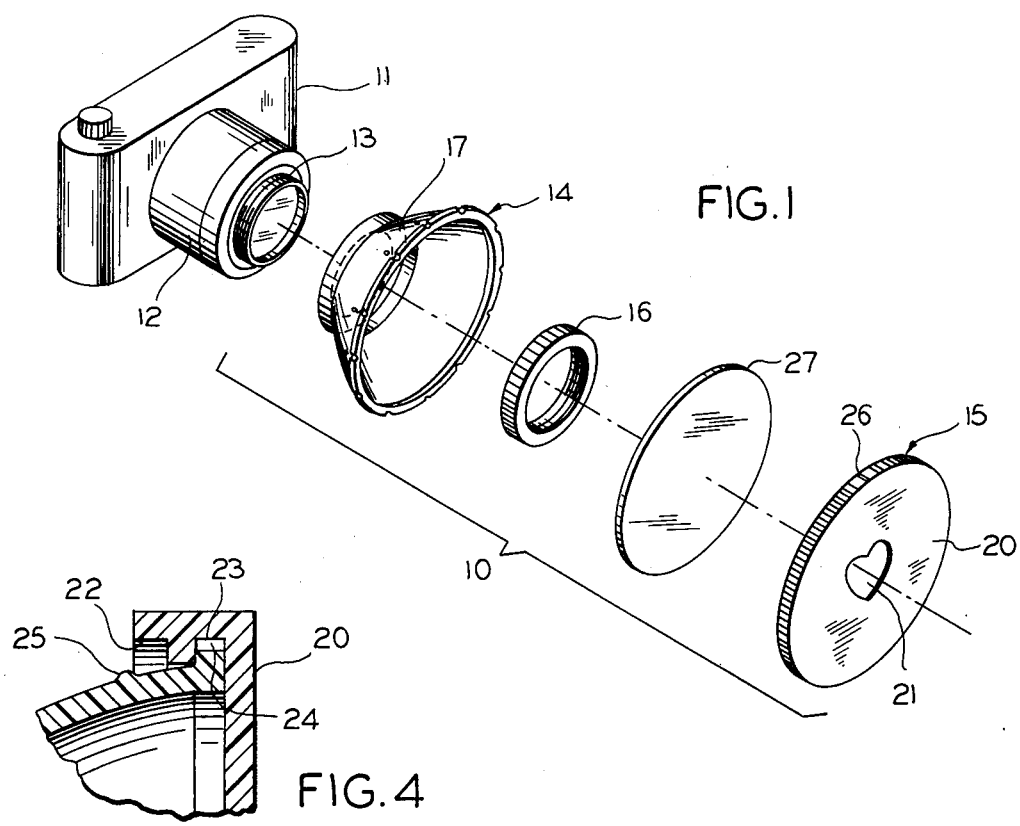
FIG. 1
FIG. 4
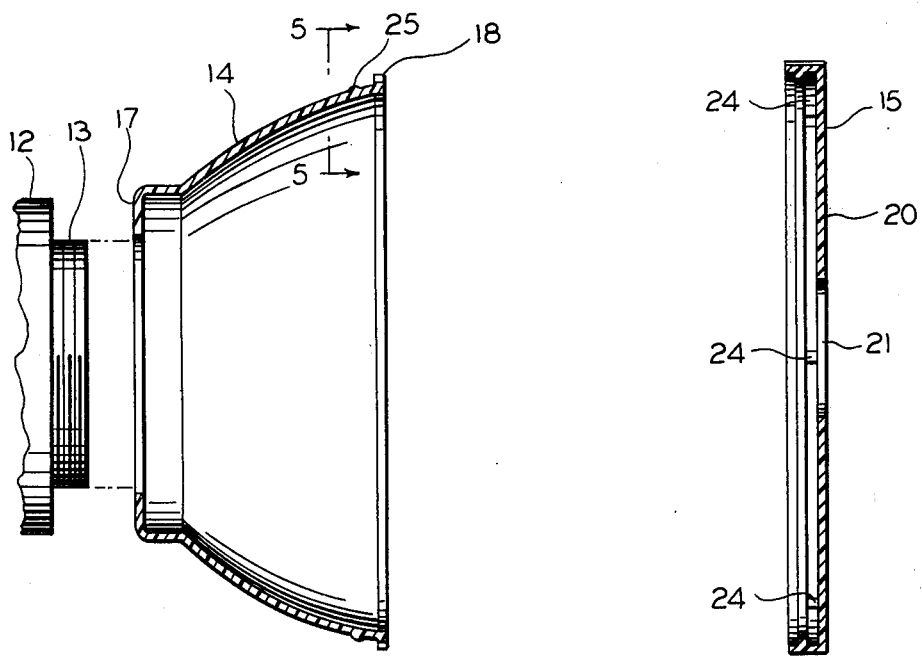
FIG. 2
FIG. 3

MULTI-EFFECT PORTABLE CAMERA VIGNETTE

This is a continuation-in-part of my application Ser. No. 669,388 filed Mar. 22, 1976, entitled MULTI EFFECT PORTABLE CAMERA VIGNETTE, since abandoned.

This invention relates to camera accessories and more particularly to a portable vignetting system combining a housing with a plurality of special effect lids to accomplish a wide variety of vignetting effects.

Vignetting is a camera technique used to set off a particular area in a photograph by obscuring or blurring the image immediately surrounding the selected portion. Vignetting is generally accomplished by photographing a subject through a selected opening in an opaque mask. A wide variety of such masks having apertures cut in a wide range of sizes and shapes could be utilized; the mask was generally placed closer to the camera than the minimum focusing distance of the selected camera lens. This would result in a vignette with indistinct, out-of-focus edges, thereby producing a soft visual effect. Such vignetting screens were typically hand-made and temporized and were primarily intended for use in a studio photographic situation. Use of such masks on any field assignment created serious lighting problems and required the photographer to carry a great deal of non-standardized equipment with which to attempt his vignetting effects.

Use of the vignette technique also enables creative multiple vignette effects to be made on a single negative or photographic plate by preventing light from reaching all but a selected, well-defined area on the negative, then moving the mask to uncover another selected portion, and continuing thus until the desired number of exposures has been made. The plate or film may then be developed.

Producing such multiply exposed photographs has long been possible through the use of standard dark room techniques by printing a number of individual negatives onto the same sheet of photographic paper. This, however, is a time-consuming and expensive process and does not lend itself to on-site photography.

Past attempts at providing an easy to use effective photographic vignetter have not been entirely successful. Devices such as those illustrated in U.S. Pat. Nos. 1,068,862, Des. 234,008, and 3,122,077 have been designed to act as image splitters. Such devices, however, do not allow selective vignetting and cannot be used to provide the wide range of photographic effects made possible with the present invention. Devices such as that illustrated in U.S. Pat. No. 3,940,775 make multiple exposures and vignetting somewhat more convenient but still do not provide the accuracy and ease with which multiple exposure effects may be created with the present invention.

Use of the present invention allows selected multiple exposures to be made in accurately reproducible circular or rectangular patterns, and further enables such multiple exposures to be combined with centrally positioned exposures in a wide variety of selected vignettes.

Accordingly, the present invention has the following objects:

To provide methods and apparatus for producing multiple exposures on a single negative and regular geometric reproducible patterns;

To provide methods and apparatus for selectively creating vignettes of various shapes and shadings;

To provide methods and apparatus for combining selectively shaped vignettes with regularly arranged multiple exposures on a single plate or negative;

To provide such apparatus in forms suitable for use with portable hand held photographic instruments;

To provide such apparatus in forms characterized by quickly and easily interchangeable vignette elements;

To provide such apparatus in forms easily attachable to a standard lens unit;

To provide such apparatus in forms efficient and inexpensive to manufacture; and To provide such methods and apparatus allowing opaque or translucent "frosted" vignette effects.

These and other objects will become more apparent upon consideration of the accompanying illustrations in which:

FIG. 1 is an exploded view of the present invention;

FIG. 2 is a side sectional view of the housing;

FIG. 3 is a side sectional view of a selected vignetting lid;

FIG. 4 is a partial side sectional view illustrating attachment of a vignetting lid to the housing;

Figure 5:
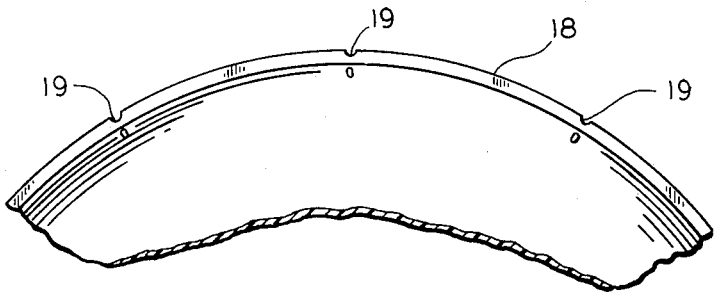
FIG. 5 is a partial front elevation of the housing illustrated in FIG. 2.

Consistent with the foregoing objects, apparatus 10, for creating selected multiple vignette effects is described, consisting of a housing 14, attachable to lens 12 of photographic instrument 11, by retaining ring 16, said housing having external lip 18 formed thereon, shaped to fit into track 23 formed on shoulder 22 of lid 15, said lip 18 having detents 19 formed thereon at regular intervals, said track 23 having stops 24 formed therein shaped to fit said detents 19, said lid 15 having vignette aperture 21 formed therethrough, whereby lid 15 may be rotated on housing 14, and may be positioned in reproducible orientations by the engagement of stops 24 in detents 19.

Referring now to FIG. 1, the numeral 10 indicates generally a portable vignetting system which, in this embodiment, is illustrated as used with a 35 millimeter, single lens reflex camera 11, having lens 12 mounted thereon. For purposes of this illustration, lens 12 is illustrated with externally threaded mounting ring 13 to which may be customarily mounted such lens accessories as filters, lens, hoods and the like. Adaptors well-known in the photographic arts may be used to provide an externally threaded mounting surface for those cameras or lenses lacking such a surface. Vignetter 10 includes housing 14 and a selected vignetting lid 15. In this embodiment, retaining ring 16 may be threaded to lens mount 13, thereby clamping flange 17 of housing 14 firmly to lens 12. Thus mounted, housing 14 does not impede any of the adjustment functions of lens 12.

As illustrated in FIG. 2, housing 14 is somewhat bowl-shaped, with internal flange 17 formed at the lens receiving end, and external flange 18 formed at the lid receiving end. As further illustrated in FIG. 5, external flange 18 has detents 19 formed thereon at regularly spaced intervals. In this embodiment, twelve such detents are formed, regularly spaced at 30 degree increments about the circumference of external flange 18.

FIG. 3 illustrates in cross section a typical vignetting lid 15 having a cover portion 20, through which vignetting aperture 21 is formed, and a circumferential shoulder portion 22 having groove 23 formed circumferentially therewithin, as shown in FIG. 4. Lid 15 may be mounted to housing 14 by press-fitting lid 15 to engage outer flange 18 into circumferential track 23. Stops 24, dimensioned to positively engage detents 19, are regularly spaced along track 23; in this embodiment six such stops are positioned at 60° intervals along the length of track 23. Each detent 19 has a raised index member 25 aligned therewith on housing 14 as illustrated in FIG. 4. With external flange 18 riding in track 23, lid 15 may be rotated with respect to housing 14. During such rotation, detents 19 are engaged by stop 24, providing regular and reproducible increments of rotation. As will be hereinbelow discussed, such regular increments of rotation make possible many special vignetting and multiple exposure effects. Each lid 15 is provided with a lid index 26 as illustrated in FIG. 1, whereby lid rotation may be easily regulated.

Figure 11:
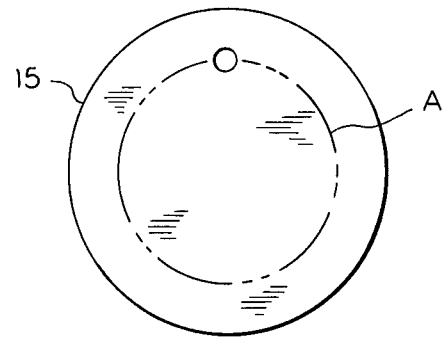
Figure 12:
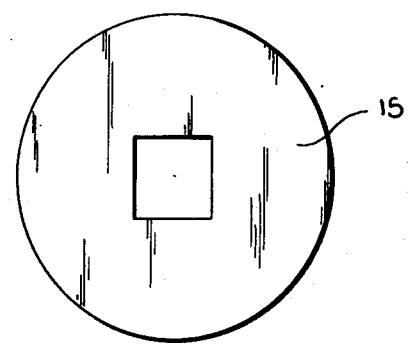
Figure 13:
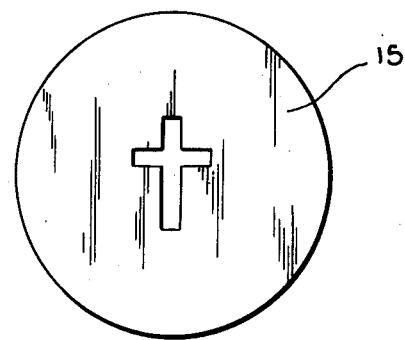
Figure 14:
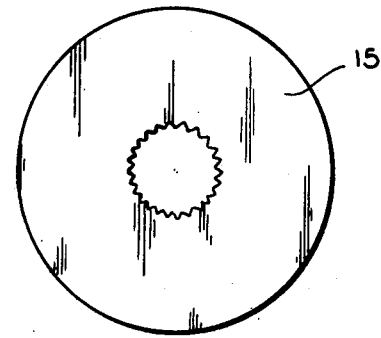

As illustrated in FIGS. 6, 7, 8, 9, 10 11, 12, 13, and 14 a wide variety of apertures may be provided for vignetting lid 15. Each such aperture provides its own special effect. In FIG. 11, lid 15 is provided with a single circular off-center aperture. Placing such a lid on housing 14 effectively exposes only a small selected portion of a film negative during shooting, as only light passing through said aperture reaches lens 12. This lid makes possible the creation of a circular series of multiple exposures on a single frame of film through use of the following procedure:

Lid 15 is first placed upon housing 14 with lid index 26 in the uppermost, or twelve o'clock, position. A first exposure is taken. Thereafter, without advancing the film, the camera shutter is re-cocked and lid 15 may then be rotated to, for example, the one o'clock position. Another exposure is then made. This sequence may be followed until the lid index returns to the twelve o'clock position. At this point the film frame will have twelve exposures uniformly spaced about the circumference of a circle, shown at A of FIG. 11. Various other effects may be created through use of such a lid by varying the distance from center of the aperture and the size and shape of the aperture.

Other apertures illustrated in FIGS. 6, 7, 8, 9, 10, 12, 13, and 14 are centrally positioned on lid 15 and may take on any desired shape. The degree to which the edges of the vignette apertures are depicted in sharp focus or as a soft blur may be controlled by the photographer by varying the size of the lens opening during shooting. A smaller lens opening, corresponding to a high $f$-stop will produce a sharper, more distinct frame about the subject, while a smaller $f$-stop, resulting in a larger lens opening will further soften and difuse the edge effect. It has been found that the vignetters herein described may successfully be used by setting the combination of shutter speed and lens aperture to photograph the subject as if no lid were being used at all. Thus, use of the vignetter herein described does not require abnormal or unusual changes in lens aperture apart from those ordinarily encountered during the photographing of a subject.

Figure 6:
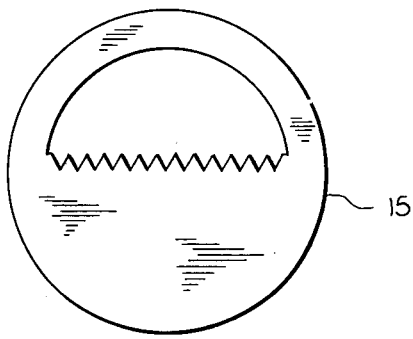
FIGS. 6 through 14 are front elevations of selected vignetting lids.

FIG. 6 illustrates an aperture comprising of a semicircular opening bordered along the diameter of the opening by a jagged edge. Such a cover enables production of a split image whereby the same subject may be exposed twice on the same frame of film. Use of the jagged edge along said diameter effectively blends both photograph halves together.

Any lid illustrated may be formed of translucent, rather than opaque material, having a centrally located aperture formed therein. Such a lid results in a diffused area about the photographic subject softer than if an opaque lid is used. Such lids may be formed not only from clear translucent materials but in a wide range of colors to make possible a wide range of photographic effects and to further provide the photographer with control of the lighting during photographic sessions.

As illustrated in FIG. 1, special coloring effects may be achieved by inserting a sheet of colored transparent film 27 as a filter to cover the aperture in the vignetting lid 15.

Figure 7:
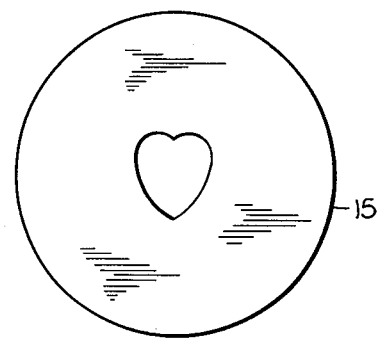
Figure 8:
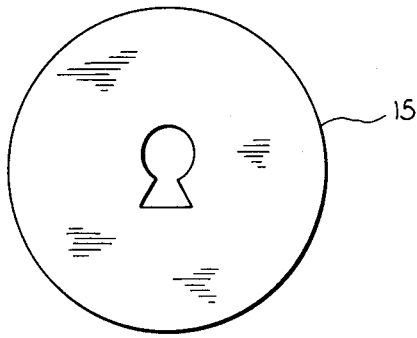
Figure 9:
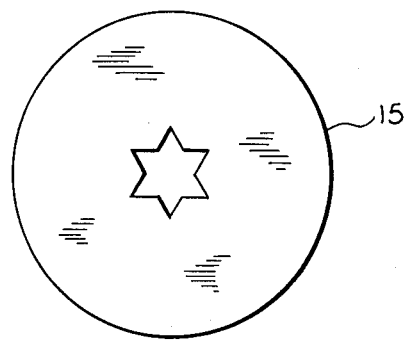
Figure 10:
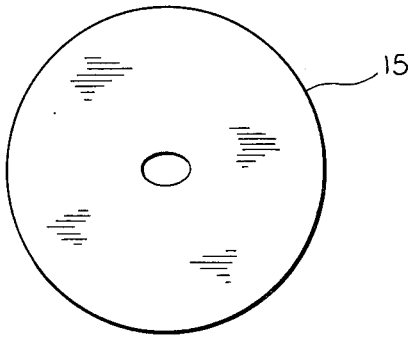

Further special effects may be created by, for example, combining the lid illustrated at FIG. 11 with a lid having a centrally exposed portion such as that of FIG. 7. The vignetting lid of FIG. 7 may first be used to create a series of twelve equally spaced exposures in a circular pattern on the film frame; this lid may then be removed and a lid having a centrally positioned aperture such as that of FIG. 11 may be substituted to add a central exposure. The resulting negative will consist of twelve smaller vignettes arranged in a circular pattern surrounding a larger centrally positioned vignette. In this manner, a wide variety of subjects and patterns may be achieved.

Rectangular exposure patterns may also be achieved by, for example, positioning exposures at the 1, 5, 7 and 11 o'clock positions or at the 2, 4, 8 and 10 o'clock positions. Similarly, differing patterns may be achieved by providing housings with varying numbers of regularly spaced detentes.

While herein illustrated as a portable attachment for cameras, the invention herein described may be equally well utilized as an accessory to a dark room enlarger with the vignette effects being created on photographic paper in the dark room.

While the present invention has been described hereinabove in connection with a specific embodiment, it is to be understood that this embodiment is presented by way of example only. It is expected that others will perceive variations which, although differing from the foregoing, do not depart from the spirit and scope of the invention as claimed.

I claim:

1. In combination with a photographic instrument having an image receiving lens, a vignetter comprising:
   hollow housing means having a pair of open oppositely disposed ends;
   mounting means,
   said mounting means positioned at the first of said ends whereby said housing means may be mounted to said lens;
   externally formed lip means,
   said lip means extending about the outer periphery of the second of said ends,
   said lip means having formed therein detents at regular intervals about the periphery of said second of said ends;
   lid means,
   said lid means having formed peripherally thereon upstanding side wall means;
   track means,
   said track means being formed interiorly on said side wall means,
   said track means being positioned to engage said lip means when said lid means is press-fitted to said housing means;
   stop means,
   said stop means being formed within said track means, said stop means being spaced apart to engage said detents when said lid means is rotated with respect to said housing means, said lid means having formed therethrough vignette aperture means, said vignette aperture means being sized and shaped to enable passage of a selected fraction of light reflected from an image through said housing to said lens.

2. The apparatus as recited in claim 1 wherein said vignette aperture means is formed through said lid means at an off-center site, whereby rotation of said lid means on said housing means effects movement of said aperture means in a circular path.

3. The apparatus as recited in claim 1 wherein said housing means further includes index means, one said index means being formed on said housing means proximate to and aligned with each said detent.

4. The apparatus as recited in claim 1 wherein said lid means further includes indicator means, said indicator means being positioned exteriorly on said lid means proximate to at least one of said stop means.

5. The apparatus as recited in claim 1 wherein said housing means has twelve said detents formed thereon at regular intervals.

6. The apparatus as recited in claim 1 wherein said housing means is circular in transverse cross-section and bowl-shaped in external configuration.

7. The apparatus as recited in claim 1 wherein said track means has six said stop means formed therein at regular intervals.

8. The apparatus as recited in claim 1 wherein said lid means is translucent.

9. The apparatus as recited in claim 1 wherein said lid means includes photographic filter means positioned to cover said aperture means.

10. The apparatus as recited in claim 1 wherein said vignette aperture means is formed in the shape of a square.

11. The apparatus as recited in claim 1 wherein said vignette aperture means is formed in the shape of a circle.

12. The apparatus as recited in claim 1 wherein said vignette aperture means is formed in the shape of an ellipse.

13. The apparatus as recited in claim 1 wherein said vignette aperture means is formed in the shape of a cross.

14. The apparatus as recited in claim 1 wherein said vignette aperture means is formed in the shape of a star of David.

15. The apparatus as recited in claim 1 wherein said vignette aperture means is formed in the shape of a circle with serrated periphery.

* * * * *